(12) United States Patent
Madhavan

(10) Patent No.: US 8,612,174 B2
(45) Date of Patent: Dec. 17, 2013

(54) METHOD AND APPARATUS FOR DYNAMIC 6DOF MEASUREMENT

(76) Inventor: Viswanathan Madhavan, Gaithersburg, MD (US)

( * ) Notice: Subject to any disclaimer, the term of this patent is extended or adjusted under 35 U.S.C. 154(b) by 417 days.

(21) Appl. No.: 13/042,395

(22) Filed: Mar. 7, 2011

(65) Prior Publication Data
US 2012/0059624 A1   Mar. 8, 2012

Related U.S. Application Data

(60) Provisional application No. 61/311,302, filed on Mar. 6, 2010.

(51) Int. Cl.
*G01C 9/00* (2006.01)
(52) U.S. Cl.
CPC ..................................... *G01C 9/00* (2013.01)
USPC ........................................................ 702/153
(58) Field of Classification Search
USPC ................... 702/153, 155, 182–185
See application file for complete search history.

(56) References Cited

U.S. PATENT DOCUMENTS 7,961,909 B2 * 6/2011 Mandella et al. ............. 382/103

FOREIGN PATENT DOCUMENTS

DE  10 2008 024395   12/2009
WO  WO9930502      6/1999

* cited by examiner

*Primary Examiner* — Edward Raymond

(57) ABSTRACT

A method and apparatus is disclosed that modulates the position of one target tracked by a position measuring instrument, measures the path of the target, fits the parameters of a mathematical representation of the time varying path to the path of the target measured as a function of time, and obtains the position, orientation and velocity of the object on which the apparatus is mounted. Key aspects of the modulating nest and the improved method for determining the best fit mathematical representation of the path of the target resulting from the combined effect of the modulation and the motion of the object are disclosed.

36 Claims, 12 Drawing Sheets

| Segment | Xo(mm) | Yo(mm) | R(mm) | Vx(mm/s) | Vy(mm/s) |
|---|---|---|---|---|---|
| 1 | 11.87 | 11.07 | 38.64 | 44.29 | -13.75 |
| 2 | 26.63 | 6.49 | 52.00 | 33.83 | 22.60 |
| 3 | 37.91 | 14.03 | 64.17 | 71.89 | -8.81 |
| 4 | 61.87 | 11.09 | 38.63 | 44.16 | -13.83 |
| 5 | 76.59 | 6.48 | 51.96 | 33.98 | 22.65 |
| 6 | 87.92 | 14.03 | 64.18 | | |

| Segment | Xo(mm) | Yo(mm) | R(mm) | Vx(mm/s) | Vy(mm/s) | Vz(mm/s) |
|---|---|---|---|---|---|---|
| 1 | 0.01 | 0.00 | 49.98 | 50.02 | 0.10 | 0.00 |
| 2 | 16.68 | 0.00 | 50.01 | 50.06 | 0.00 | 0.00 |
| 3 | 33.26 | -0.10 | 49.88 | 50.55 | -0.18 | 0.00 |
| 4 | 50.93 | 0.57 | 49.87 | 47.14 | 1.47 | 0.00 |
| 5 | 66.46 | -0.10 | 49.96 | 51.04 | -0.18 | 0.00 |
| 6 | 83.25 | -0.10 | 49.88 | 50.59 | -0.18 | 0.00 |

FIG. 17

| Subtended Angle | Max position error (mm) | 2sigma position error (mm) | Max angular error (°) | 2sigma angular error (°) | Δx due to Δθ for offset of 100mm (μm) | Δx due to Δθ for offset of 1000mm (μm) |
|---|---|---|---|---|---|---|
| ±180° | 0.0026 | 0.0016 | 0.0012 | 0.0009 | 1.6 | 15.7 |
| ±90° | 0.006 | 0.004 | 0.0026 | 0.002 | 3.5 | 34.9 |
| ±60° | 0.011 | 0.008 | 0.0053 | 0.0042 | 7.3 | 73.3 |
| ±30° | 0.039 | 0.029 | 0.020 | 0.016 | 27.9 | 279.3 |

FIG. 18

| Subtended Angle | Max position error (mm) | 2sigma position error (mm) | Max angular error (°) | 2sigma angular error (°) | Δx due to Δθ for offset of 1000mm (μm) | Δx due to Δθ for offset of 3000mm (μm) |
|---|---|---|---|---|---|---|
| ±180° | 0.00038 | 0.00032 | 0.00022 | 0.00016 | 02.8 | 8.4 |

METHOD AND APPARATUS FOR DYNAMIC 6DOF MEASUREMENT

CROSS-REFERENCE TO RELATED APPLICATIONS

The present patent application claims benefit and priority to U.S. Prov. Pat. Appl. No. 61/311,302 entitled "METHOD AND APPARATUS FOR DETERMINING THE POSITION AND ORIENTATION OF RIGID BODIES USING POSITION MEASURING INSTRUMENTS" and filed on Mar. 6, 2010 which is hereby incorporated by reference into the present disclosure.

BACKGROUND OF THE INVENTION

1. Technical Field

The subject matter includes a method and apparatus for modulating the position of targets used by position measuring instruments such as laser trackers, to result in a modulating nest for tracker targets, that when mounted on an object enables accurate measurement of the position and orientation of the object as well as its velocity. This is accomplished without necessarily requiring communication between the improved target and the measurement system, which permits the improved nest to be used with all tracker systems. Additional utility of the improved tracker target arises from its ability to use solid glass cube corner prisms (retroreflectors) to increase the measurable range of orientations of the object while compensating for the lateral position and distance error caused by them.

2. Background Art

Large volume coordinate metrology instruments such as laser trackers are commonly used as portable Coordinate Measuring Machines (CMMs) not only to measure large objects after assembly, but also to ensure the correct interrelationship (position and orientation) of their sub-assemblies or parts during assembly. They are also increasingly being used as external metrology frames to verify the performance of machine tools and robots in-situ. The measuring instrument is independent of common sources of errors inherent to machine tools and robots, such as geometric errors, errors induced by joints, and thermal errors. The external system permits in-situ, independent, inspection, which eliminates scrap and also eliminates a inspection step typically required at the end of the processing step.

Currently, there are many types of instruments available for measuring the position (X-, Y-, and Z-coordinates, 3 DOFs) accurately. These include optical and electromechanical systems such as laser trackers, triangulation based systems such as indoor GPS (iGPS) systems and photogrammetric systems. iGPS systems use the time at which pulses emitted by a set of emitters are received by the target to triangulate the location of the receiver with respect to that of the emitters. Photogrammetric systems use a model for the optics of each of several cameras to relate the 2D images obtained by different cameras into a 3D scene, of points of interest within the scene.

Laser trackers track retro-reflective targets by driving a two-axis servo system that controls the two orientation degrees of freedom of a laser beam to keep the beam centered about the center of the target. Deviations from center are measured using a detector such as a four-quadrant position sensitive detector (PSD). In interferometric mode (IFM) the distance to the target is measured accurately by counting the interference fringes between light reflected by the target and that reflected internally by a reference mirror. There are also several other technologies for absolute distance measurement (ADM). The two orientation degrees of freedom contain very high resolution encoders to measure the beam orientation precisely. The distance and the two orientations measured are used to calculate the X-Y-Z location of the target.

The two main types of retroreflectors are cube corner reflectors (CCRs) and the cat's-eye reflector. The most commonly used retroreflective target is the Spherically Mounted Retro-reflector (SMR), that comprises of a CCR mounted within a sphere such that its corner coincides with the center of the sphere. The advantages of SMRs include the fact that they can be precisely located inside spherical nests thereby enabling the center of the nest to be measured accurately, and that if a SMR is scanned over a surface, the actual surface can be easily found from the measured points by a constant offset distance.

Different types of nests for holding retroreflectors are known, but all of them hold the SMR in position, at fixed location with respect to the object on which the target is mounted.

Position measuring (3 DOF) systems are typically extended to measure more than 3 DOFs (i.e. one or more angular orientations in addition to the three position coordinates) of an object by either simultaneously measuring multiple targets placed at fiducial points (points whose positions are well known with respect to the object) or by measuring a single target that is sequentially moved to multiple fiducial points. Measuring multiple targets is easy for some types of systems, such as iGPS and photogrammetric systems, with maybe a small penalty in data rate, but reduces the data rate substantially for systems such as laser trackers (possible when operated in absolute distance measurement (ADM) mode). Measuring a single target at multiple positions is easier for systems such as laser trackers, where each tracker can track a target at very high rates, but the target has to be manually moved to multiple locations.

The Leica T-MAC and the API SmartTrack utilize alternate complementary metrology solutions to extend the capability of laser trackers in order to be able to measure 6-DOFs. The T-MAC system uses a target comprised of a standard retroreflective target as well as multiple LEDs fixed at fiducial points on the target. The system augments the measurement of the position of the retro-reflective target made by the tracker with orientation measurements derived from photogrammetric measurement of the position of the LEDs, to measure the position and orientation of an object. The stated accuracy of orientation measurements is not very high. The API SmartTrack system utilizes an "Active Target™" that uses servos to track the orientation of the laser beam with respect to the retro-reflector and the readings of the encoders on the servos provide two orientation degrees of freedom (pitch and yaw about the laser beam) of the target. The third orientation (roll about the laser beam) is determined using the polarization axis of the beam. Again, the stated accuracy of orientation measurement is not high. In addition, the complexity and cost of these systems is very high.

There are other means of tracking the position and orientation of objects (6 DOF), such as inertial trackers, but these are of low accuracy and precision to be useful for industrial metrology applications where the accuracy is often required to be better than 100 μm. Goszyk (WO 99/30502) describe a method for three dimensional object path tracking using a device that measures the position of one reflector point using three sensors. To measure additional degrees of freedom, additional reflector points are used. The subject matter of the present invention addresses a method for determining the position, orientation and velocity of an object, accurately over a large volume, using only one target point whose position is measured over time.

Runge (DE 10 2008 024 395 A1) discloses a system called A-TOM for measuring 6DOF of quasi-stationary objects using a motor-driven device to move the laser tracker retro-reflector target in a circle. The orientation of the circle is used to determine two orientations (pitch and yaw) and the roll of the object is measured using an encoder. Synchronization of the rotation measurement and the laser tracker used for point measurement is required, in order to determine the orientation of the coordinate frame with respect to which the circle is oriented. This synchronization is achieved using trigger signals directly from the encoder to the laser tracker system. It is claimed that the two can be synchronized to within a few microseconds, thereby making the error in roll determination arising from this to be negligible. However, the jitter in encoder signal (which depends on the precision of the encoder) and other software and hardware delays between triggering and the acquisition of the points by the laser tracker (which may be uncontrollable and variable) can cause this registration between signals to be off, resulting in significant error in roll determination. In addition, the above requirement for communication between target device and the laser tracker causes significant practical difficulties. Most importantly, it is shown later in this document that this method will only work for quasi-stationary objects.

Additionally, since the aim is to track and measure the orientation of objects, it is beneficial to do this over as wide a range as possible. Solid glass corner cube reflectors (CCRs) have a much higher acceptance angle (±50°) compared to the +−20 deg for open glass SMRs). Cat's eyes have an acceptance angle of ±60°, but are very expensive. In the interest of cost and robustness, solid glass SMRs would be preferred. However, to use these, there needs to be a method to compensate for the viewing angle. If the orientation of the object were known from measurement, such compensation can be readily accomplished.

It is an objective of this invention to develop a method and apparatus to modulate the position of one target tracked by one position measuring system so as to accurately and dynamically measure the position, orientation and velocity of an object on which the target is mounted, over a large measuring volume. It is a further objective to be able to determine all six degrees of freedom without any need for triggering or other communication between the modulating device and the position measuring device. It is a further objective of this invention that the modulated target be robust and its acceptance angle made as high as possible.

BRIEF SUMMARY OF THE INVENTION

The essence of the invention is to improve the fixture (nest), that holds the target of a position measuring system to an object, so as to add a well-known and highly repeatable modulation to the position of the target, with enough features to permit identification of the location and orientation of the path, and to include the movement of the object in processing the measured path of the target to measure the position and orientation of the object. For instance, this can be accomplished by locating the target on a motor driven high precision rotary bearing or using a crank-driven deflection member. During an initial calibration process, carried out with the object (commonly a rigid body on which the improved tracker is located) being stationary, the measured path of the target due to the modulation of its position by the nest, called the static target path, can be measured. The feature(s) of the object whose position and orientation are of interest can also be measured, by the same position measuring system, and their locations with respect to the static path of the target can be identified. The static target path can be analyzed to obtain parameters (for instance, the center of the circle, the axis of the circle, and the location of one or more fiducial marks such as detents or other deflections away from circularity, that can be identified by filtering the positions) that can be used to determine the transformation (translation and rotation) that relates parameters of the path to the position and orientation of the features of interest. Thereafter, continuous or continual measurements of the path can be made over one or more intervals of time and analyzed to obtain the parameters of the path, which can then be transformed to obtain the position, orientation and velocity (translational and rotational) of the object in a continuous or continual manner. While it will be simpler to infer the motion of the rigid body if the speed of movement of the target along the path were well controlled, this invention also encompasses the situation wherein geometric analysis of the recorded path data is sophisticated enough to account for variations in speed along the path and allow the motion of the rigid body to be determined. In addition to the path measured by the tracker, other data related to the path, such as the readings of an encoder measuring the angular orientation of target as it is rotated with respect to the base of the rotary stage, may also be used in the calculation of the path parameters. The modulation of the target position can either be preset or can be controlled depending on the orientation of the target to the tracker. For instance, by calculating the viewing angle from the tracker using the known position and orientation of the object being tracked, the oscillation angle of the target can be automatically controlled to keep it centered about the viewing direction. The calibration process could also assume different forms, for instance, measurements of the improved target and/or the rigid body on which it is mounted, by a high accuracy touch-probe type CMM, could be analyzed to determine the parameters of the modulation path of the modulating nest nest as well as the position and orientation of the feature of interest.

BRIEF DESCRIPTION OF THE DRAWINGS

These and other aspects will now be described in detail with reference to the following drawings.

DETAILED DESCRIPTION OF THE INVENTION

Figure 1:
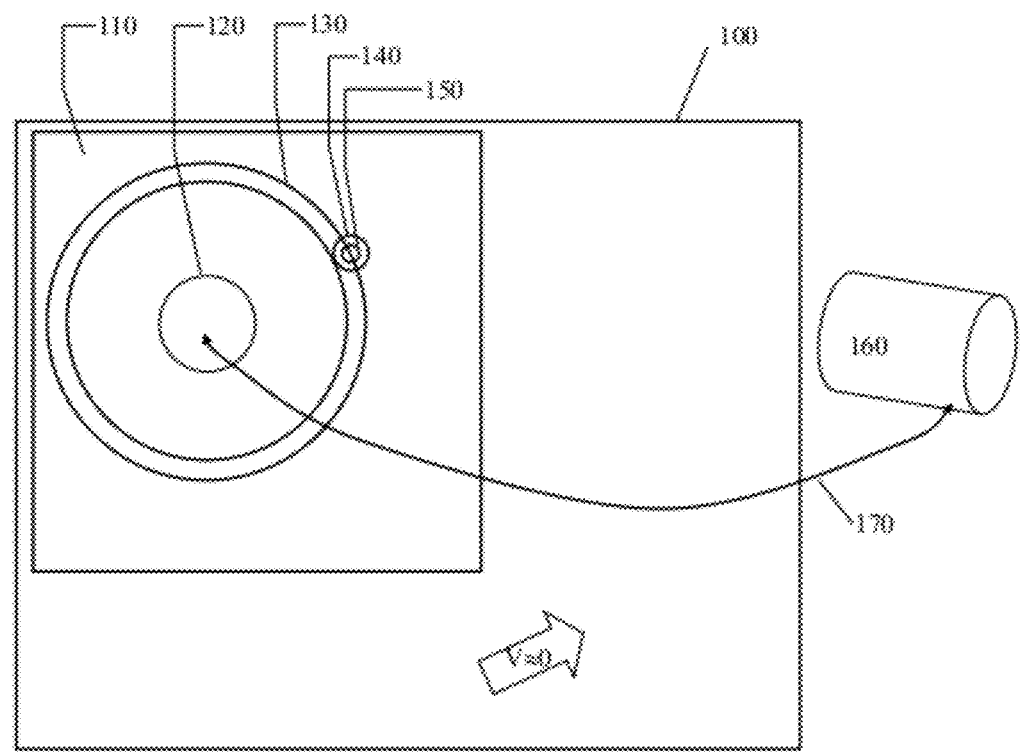
FIG. 1 shows a schematic of the most relevant prior art (Runge DE 10 2008 024 395 A1) applicable to cases where the object is quasi-stationary, wherein communication is required between and encoder or triggering device and the position measuring device in order to synchronize the readings and use the starting measurement to synchronize tracker and the object coordinate frames so that the roll angle can be determined from the encoder measurements.

We begin by describing the most relevant prior art (Runge DE 10 2008 024 395 A1) so that the present invention and its advantages may be suitably highlighted. FIG. 1 shows a fixture 110 for moving the target 150, located on nest 140, along a known trajectory 130, using device 120. The example device 120 mentioned is a motorized bearing with an encoder attached. The position measuring device 160 (a laser tracker) measures the path of the target. By fitting a circle to the path measured 5 degrees of freedom (DOF), namely, the center of the circle and two orientations are determined. The sixth DOF is determined from encoder measurements. The encoder measurements are used to trigger the laser tracker, thereby maintaining synchronization between all 6DOF, as well as for tracking the roll of the object about the center of the bearing. As will be shown below, this method is only applicable to cases where the object is quasi-stationary. Furthermore, communication, 170, is required between and encoder or triggering device and the position measuring device in order to synchronize the readings and use the starting measurement to synchronize tracker and the object coordinate frames so that the roll angle can be determined from the encoder measurements.

It is an objective of this invention to develop improved methods and apparatus for modulating the position of a tracked target and improved data processing methods that enable accurate dynamic measurement of the position, orientation and velocity of an object using only one position measuring device. It is a further objective to be able to determine all six degrees of freedom without any need for triggering or other communication between the modulating device and the position measuring device.

Figure 2:
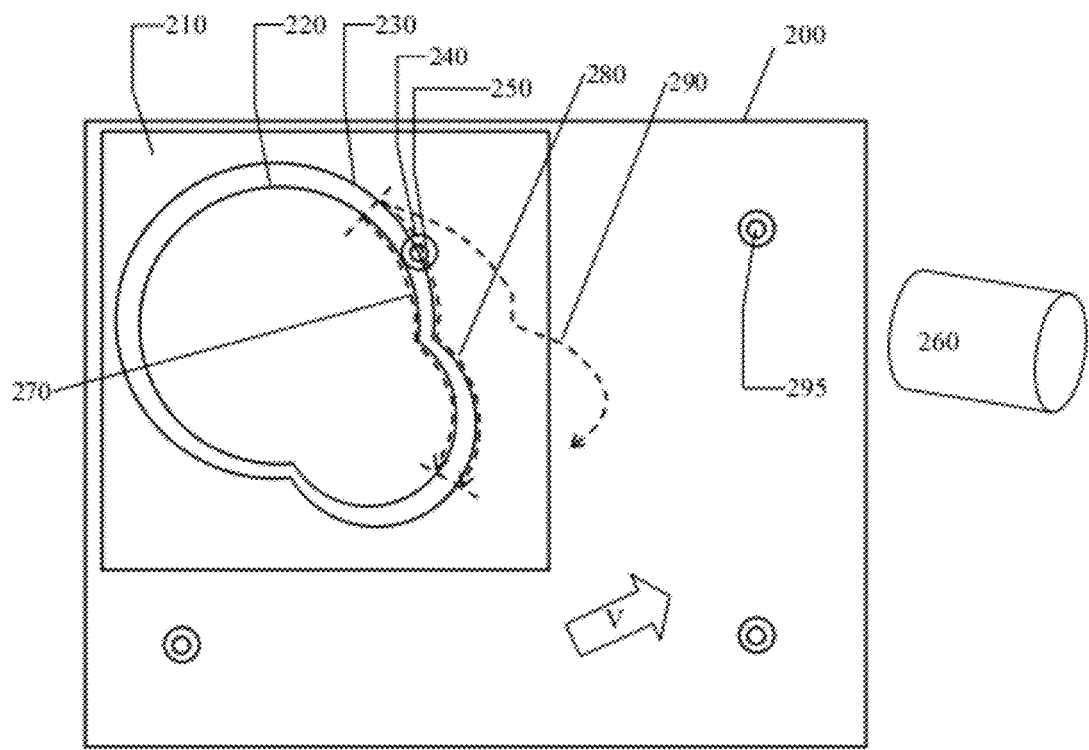
FIG. 2 shows a schematic of the improved device in use to track the position, orientation and velocity of a moving object, wherein the modulation path has features that permit unique identification of the 6DOF of the static target path so that no communication or synchronization is required between the modulated target and the position measuring device

FIG. 2 shows a schematic of the improved device disclosed here. All six degrees of freedom of the object 200, on which the modulating nest 210 is located, are obtained by using a modulation device to control the position and/or orientation of the nest 240 and the target 250 along a rotationally asymmetric modulation path 220, said path referring to both the position and orientation of the target at each point. The asymmetric modulation path can be an open or closed path and can be achieved by using one or more of a variety of mechanical elements and mechanisms, including bearings, gears, cams, kinematic mounts and elastic deflection members.

When the object 200 is stationary, one full traverse of the modulation path 220 by the nest causes the modulated target to move along a static target path 230, which is measured by the position measuring device 260 tracking the target 250. The nest need not be traversed along the full modulation path, but only along a sufficient length of the path 270, required to permit determination of the position and orientation of the whole path 230, various methods for which are described later. The corresponding portion of the static target path, 280, is measured by the position measuring device. When the object 200 moves with velocity V, the static target path is modified to result in the dynamic target path segment 290 which is what is measured by the position measuring device. The measured path segment would lie closely surrounding the dynamic target path, each point deviating from the actual dynamic path by the amount of error in the measurements.

In another embodiment, the modulation path may be rotationally symmetric, but the static target path may be rotationally asymmetric, for instance, by the use of a glass cube corner as the target.

A full traverse of the static target path 230 could be comprised of a sum of disjoint, adjacent, or overlapping unique portions of the static target path that could each be estimated and used to fit the dynamic target path. The fitting process could further refine the estimation and identify the actual region of the static target path 280 that has been transformed into the dynamic target path 290 and used for the fitting.

In one embodiment, the restriction for maintaining the object being measured stationary is eliminated by using a mathematical representation of the dynamic path of the target that explicitly includes both the translational and rotational velocity of the object as parameters, and using any one of a range of standard non-linear optimization algorithms to find the parameters that best fit the measured path segment. The velocity of the object is assumed to be constant and the average position, orientation and velocity of the object during the time interval of measurement of the measured path segment is determined from the parameters of the best fit path.

In another embodiment, the acceleration terms are also used in the mathematical representation of the dynamic target path and values that best fit the measured path are obtained by the fitting process, allowing determination of the position, orientation and velocity of the object as a function of time. The modulation path and mechanism would be robust enough that the modulation velocity or path does not change appreciably due to the motions of the object and are independent of it.

The static target path 230 and its position and orientation with respect to the object 200 (i.e. with respect to one or more feature or locations of the object) are accurately established during a calibration step described in detail later. This relationship is used to identify the position and orientation of the object from that of the static target path.

The calibration process may also establish the active regions of the modulation path over which the position of the target is modulated, if the modulation were to be thus restricted.

In one embodiment, the asymmetry of the known static target path would by itself permit unique identification of the static target path corresponding to the measured path segment and thus permit accurate measurement of the 6DOF of the static target path 230 from which the 6DOF position and orientation as well as the velocity of object 200 can be determined. This will not require any communication or coordination between the modulating nest 210 and the position measuring device 260.

In another embodiment, the modulation of the position of the target over the static target path is carried out in a highly repeatable manner, possibly at a known rate of movement, which is determined during calibration. This, coupled with knowledge of the region of the static target path traversed during the previous measuring interval, permits unique identification of the region of the static target path used, 280. The fitting process can be so that features of the static target path could be used to detect and compensate for any deviations from the expected modulation of the target. This will also not require any communication or coordination between the modulating nest 210 and the position measuring device 260.

In yet another embodiment, one or more encoders attached to one or more mechanical elements used to effect the modulation can be used to track the position of the nest along the modulation path, thus easily identifying the portion of the static target path 280 corresponding to the time interval of the measured path segment 290.

Two or more of the methods for identifying the region of the static target path corresponding to the measured dynamic target path can be combined to make this more robust.

It is a further objective of this invention that the modulated target be robust and its acceptance angle made as high as possible. In one embodiment, this can be accomplished by using a cube corner prism as the target 250. This will cause the static target path 230 to quite different from the modulation path 220. However, since the static target path is related to the actual position and orientation of the object during the calibration process, measurement of the position and orientation of the static target path corresponding to each measured path segment will permit accurate measurement of the position, orientation and velocity of the object without the lateral position or distance errors typically caused by cube corner prisms.

For targets with essentially unrestricted acceptance angles (such as an omnidirectional or "whole viewing angle" Cat's Eye, or an active target) there may be no or only minimal restriction on the manner in which the position of the target is modulated (for instance, the orientation of the plane of modulation with respect to the tracker location, whether the rotation is a full circle of an oscillation over an arc, etc.). The target can be mounted on a motorized bearing or a rotary stage and rotated in any plane relative to the viewing direction of the tracker. If the acceptance angle of the target is limited, then certain planes of rotation will permit complete rotations, whereas others may permit only oscillations within a certain arc, so that at all points within the arc of the target can be tracked by the tracker. However, the effect of measurement errors and path errors, due to things such as the runout of the bearings, on the determined orientation of the rigid body will be smaller as the central angle subtended by the arc increases.

Another improvement may be to use an active tracker on the bearing, or to mount the bearing on which the fixed tracker is mounted on another bearing or rotary stage whose axis is perpendicular to the axis of the bearing (so the whole thing becomes like a gimbal) with a precise angular output so that the body can rotate completely about two axes and the target may still be positionable to be in the view of the laser tracker at all times.

Figure 3:
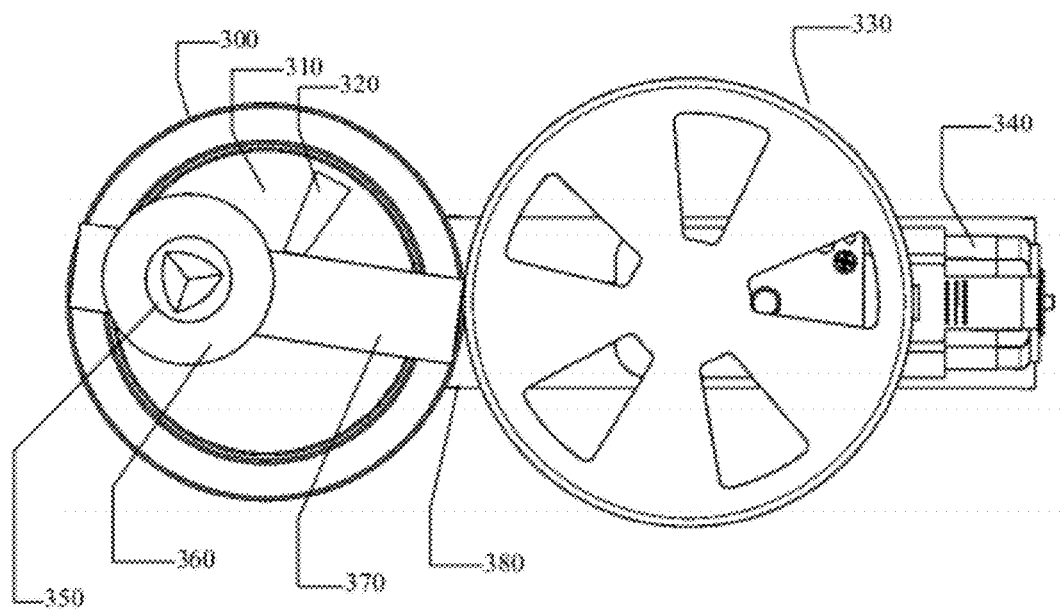
FIG. 3 shows a top view of a preferred embodiment
Figure 4:
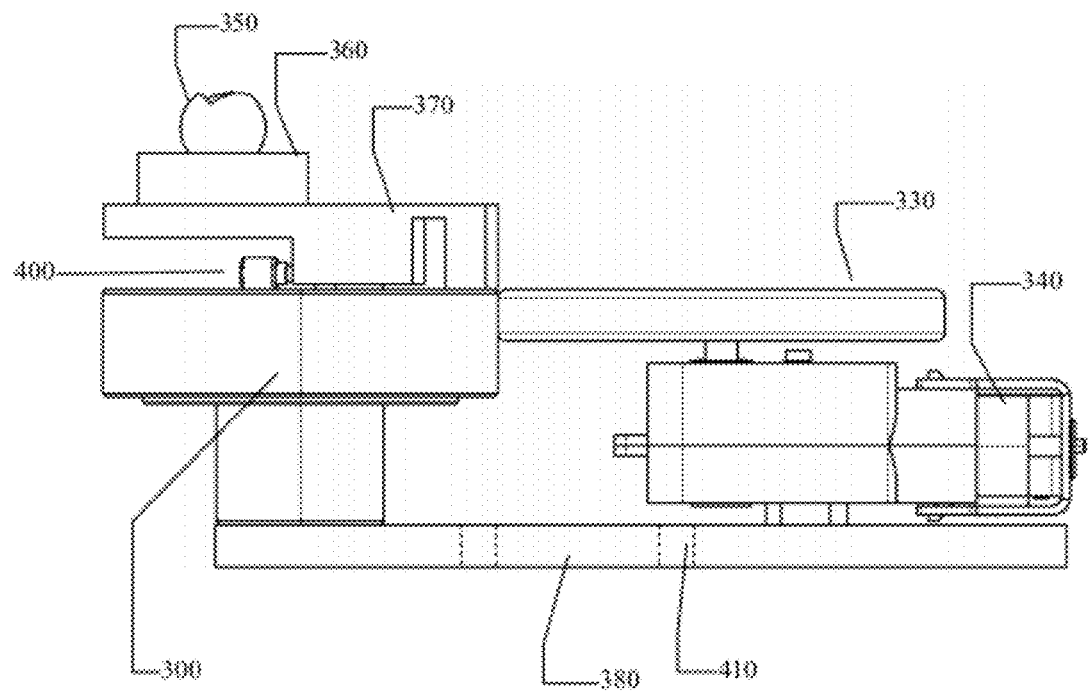
FIG. 4 shows a front view of the same preferred embodiment
Figure 5:
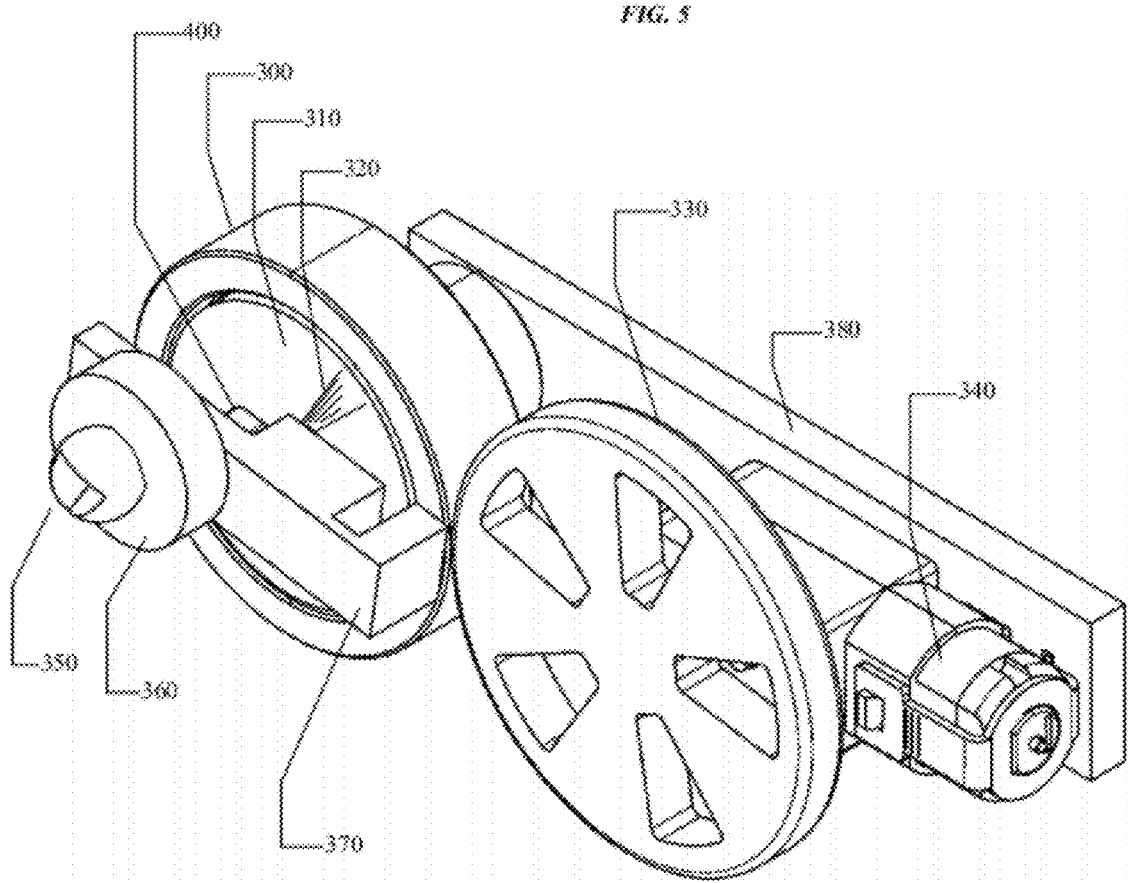
FIG. 5 shows the isometric view of the preferred embodiment

FIGS. 3, 4 and 5 shows three views of a preferred embodiment of the method described above. The base 380 is securely affixed to the object being measured using one or more locating features 410. The inner raceway of a precision rotary bearing 300 is securely affixed to the base 380 and the outer raceway is driven by a motor and gearbox assembly 340 using a friction wheel 330 (which may preferably be replaced by a belt). The bearing will preferably be oriented such that its axis points in the general direction of the laser tracker that is tracking the target. A planar cam 310 is located securely parallel to the inner raceway of the bearing 300, with its center approximately coinciding with the center of the bearing 300, and contains a protrusion 320 located at one angular segment. An elastic deflection arm 370 is securely affixed to the outer raceway of the bearing on which the nest 360 and target 350 are located. The arm is statically and dynamically balanced by adding weights (not shown in the sketches) to that the rotation of the bearing is smooth and does not induce inertial forces.

The deflection arm 370 contains a cam follower 400 that rolls along the cam 310, causing the target 350 to trace out a precisely circular path when the object is stationary. When the cam follower 400 rolls over the protrusion 320, the deflection of the deflection arm 320 causes the path to locally deviate from the planarity and circularity of the rest of the path. This provides one feature that can be detected and used to establish the orientation of the path purely based on the path segment measured by the position measuring device; this feature may or may not be adaptively filtered out of the data prior to establishing the position of the path. Based on the position and orientation of the path, the position and orientation the object can be established. The sizes, accuracy classes, speed, etc. of the elements described above can be varied depending on the requirement of the application.

Figure 6:
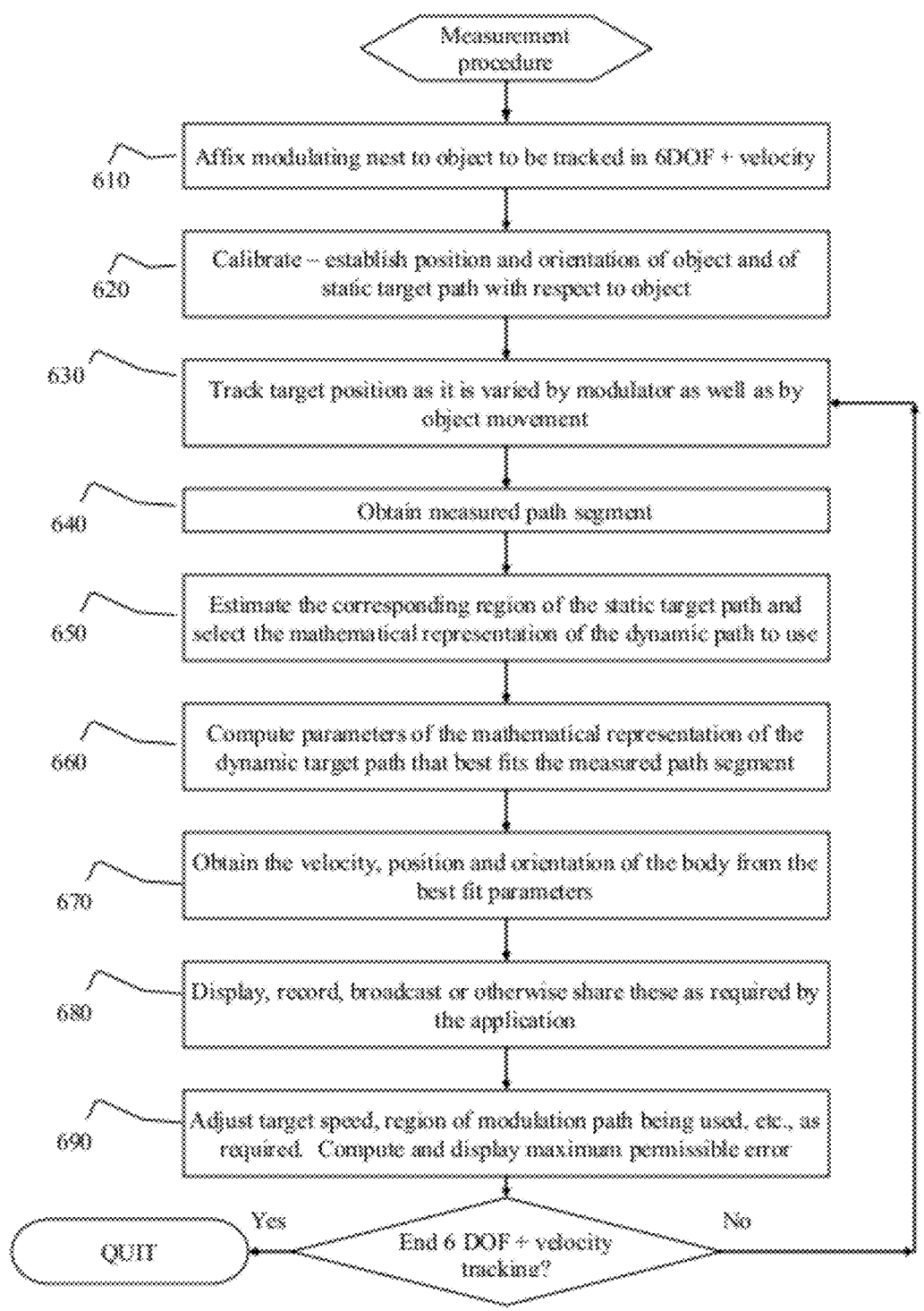
FIG. 6 shows a flowchart of the various steps in the method for measurement of the position, orientation and velocity of an object

FIG. 6 shows a flowchart summarizing the various steps in the disclosed method for continual measurements of the position, orientation and velocity of an object. The steps include 610: affixing the modulating nest to object to be tracked in a manner that precludes relative movement of the object and the modulating nest; 620: Calibration whereby the position and orientation of the object and of the static target path with respect to the object are established; 630: Tracking the target position as it is varied by the combined effect of the modulator as well as the movement of the object; 640: Communicating with measurement system controller to obtain measured path segment, comprising the position and corresponding time for each point; 650: Estimating the region of the static target path corresponding to the dynamic target path measured and selecting the mathematical representation of the dynamic path to use; 660: Computing the parameters of the mathematical representation of the dynamic target path that best fits the measured path segment and identifies the actual region of the static target path corresponding to the measured path segment, using a nonlinear optimization routine that minimizes the sum of the squared errors (SSE); 670: Obtaining the velocity, position and orientation of the body from the best fit parameters of the dynamic target path, using the relationships established during calibration; 680: Displaying, recording, broadcasting or otherwise sharing the measured position, orientation and velocity of the object as required by the application, including triggering of appropriate alarms and/or corrective actions when certain limit conditions are exceeded; 690: Adjusting the modulation speed of the target, the region of the modulation path being used, etc., as required based on the measured orientation of the modulating nest and the target with respect to the position measuring system, computing and displaying the maximum possible error (MPE), etc.

Iterating through steps 630 through 690 results in continual update of the results, i.e., the object's position, orientation and velocity, at the rate at which the path segments are measured. The rate can be adjusted depending upon user input, or based upon the velocity of the object. To ensure accuracy of the measurement results, the modulation speed and data acquisition rate may also be correspondingly adjusted.

When the object whose position and orientation are tracked with the aid of the modulated target is a small portable handheld probe, the disclosed method of position and orientation measurement will provide capabilities similar to that of the Leica T-Probe™. The probe can have multiple sets of locating points via which the modulating test may be affixed to it, so as to enable multiple probing directions.

Figure 7:
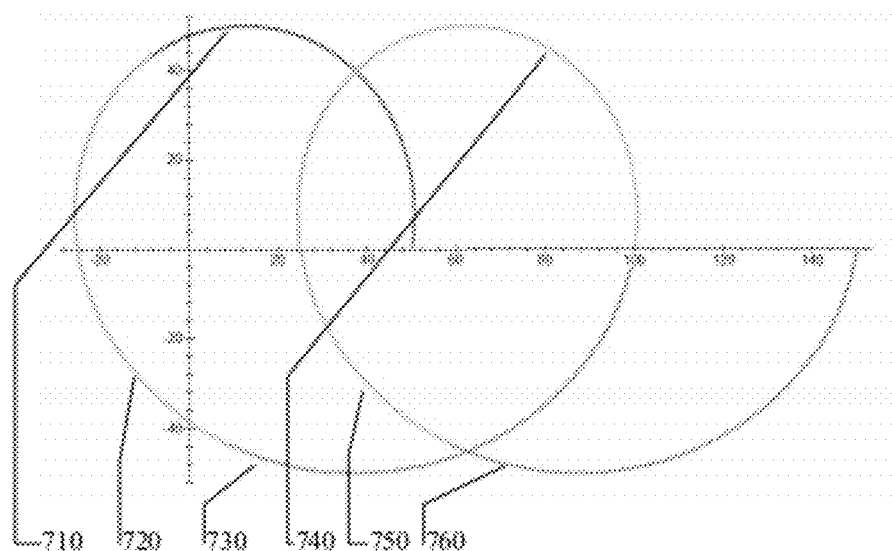
FIG. 7 shows a simulation of the points measured by a position measuring device with 25 μm rms error, while the object is moving at constant velocity of 50 mm/s along the x-direction, divided into six measured path segments, each containing 120 points spanning 120° of arc of the modulation path

FIG. 7 shows a simulation of the points measured by a position measuring device with 25 μm rms error, while the object is moving at constant velocity of 50 mm/s along the x-direction, divided into six measured path segments, 710 through 760, shown in different colors, each containing 120 points spanning 120° of arc of the modulation path.

Figure 8:
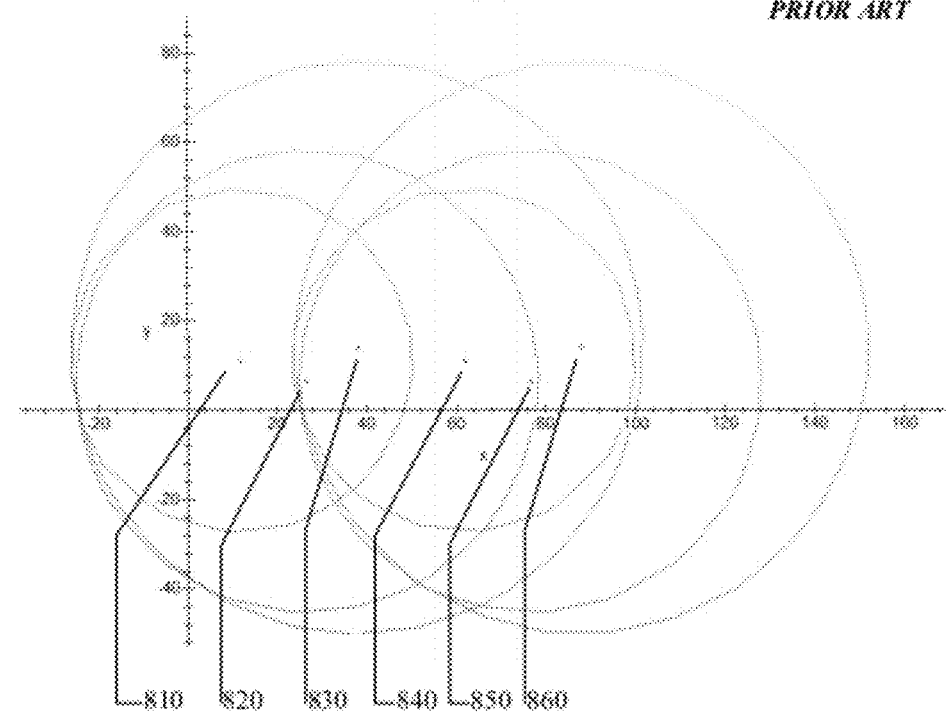
FIG. 8 shows the best-fit static circles obtained using the method of the prior art, to each of the measured path segments in FIG. 7, as well as the centers of these circles, making it clear that the mean position of the object as well as its velocity are erroneously identified
Figure 9:
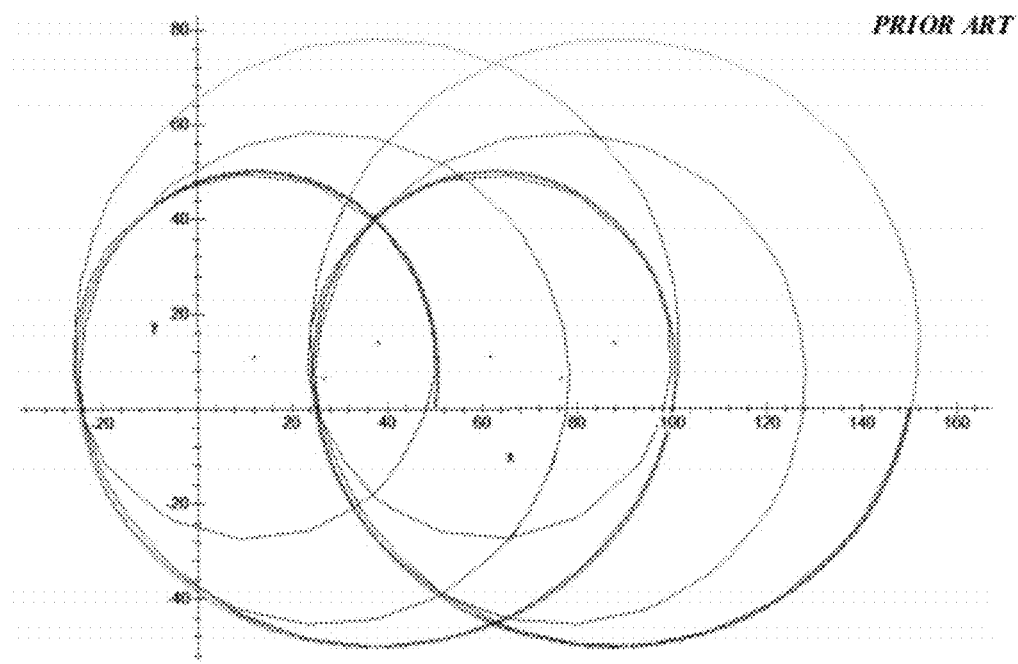
FIG. 9 shows that the best fit circles are indeed good fits to each measured path segment

FIG. 8 shows the best-fit static circles obtained using the method of the prior art, to each of the measured path segments in FIG. 7, as well as the centers of these circles. It can be noted that, since the centers of the circles do not lie equally spaced along a straight line, as is expected for the constant, uniform motion that the point data is derived from, the centers of the circles do not provide a good estimate of the position of the object. If the centers were to be used as the best estimates of the position of the object, the mean position of the object as well as its velocity will be erroneously identified. FIG. 9 shows that the best fit circles are indeed good fits to each measured path segment, so this error does not arise from the error in curve fitting, but from the nature of the curves that result from the combined motion of the modulator and the object.

Figure 10:
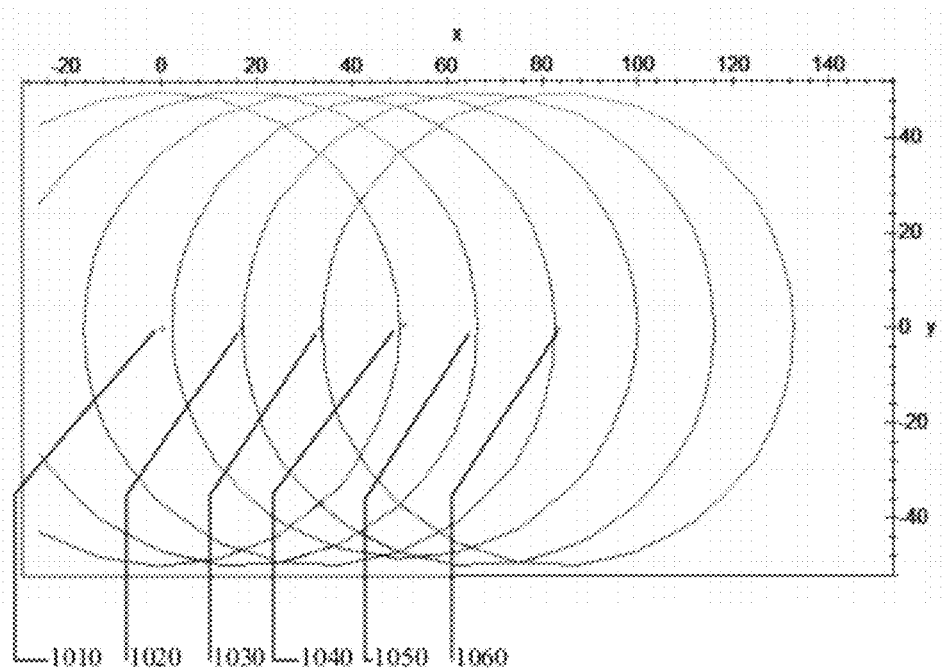
FIG. 10 shows the best fit circles to the measured path segments in FIG. 7, obtained by the disclosed method of including the velocity of the object into the mathematical representation of the dynamic target path. From the position of the centers, it is clear that the average position over the time of each segment and the object velocity are obtained correctly.

FIG. 10 shows the best fit circles to the measured path segments in FIG. 7, obtained by the disclosed method of including the velocity of the object into the mathematical representation of the dynamic target path. The parametric path equation used is $Z=(X-tV_x-X_0)^2+(Y-tV_y-Y_0)^2-R^2+tV_z$, where t is the time within each measured path segment, $X_0$ and $Y_0$ are the centers of the modulation path at the beginning of each time interval and $V_x$, $V_y$, and $V_z$ are the components of the velocity of the object; note that only the translational velocity is considered for ease of illustration. From the position of the centers shown in FIG. 10, it is clear that the positions and the object velocity are obtained correctly.

Figures 11, 12, 13:
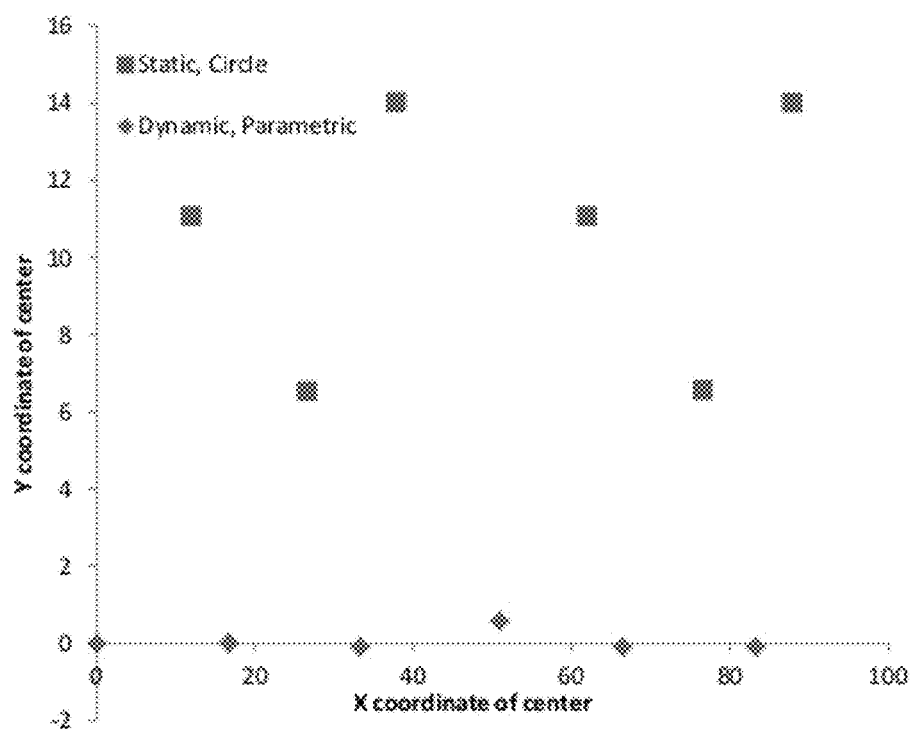
FIG. 11 tabulates the centers, radii and velocities computed from the centers by finite difference, obtained from the best-fit static circles method of the prior art FIG. 12 tabulates the centers, radii and velocities directly obtained by the fitting procedure disclosed here, wherein the mathematical representation of the dynamic target path includes the components of the velocity of the object as parameters
FIG. 13 shows the comparison of the mean object positions obtained from the prior art static circle fitting procedure and the method of fitting to the dynamic target path introduced here

FIG. 11 tabulates the centers, radii and velocities computed from the centers by finite difference, obtained from the best-fit static circles method of the prior art. The wide variation in measured velocity is clearly brought to the fore here. FIG. 12 tabulates the centers, radii and velocities directly obtained by the fitting procedure disclosed here, wherein the mathematical representation of the dynamic target path includes the components of the velocity of the object as parameters. FIG. 13 graphically shows the comparison of the mean object positions obtained from the prior art static circle fitting procedure and the method of fitting to the dynamic target path introduced here. From the above, it is clear that the method disclosed here performs much better than the method of the prior art. In fact, as the rms noise in the measurement of the points decreases, fitting to the dynamic target path converges to the exact position and velocity of the object. This makes it clear that the one point in FIG. 13 showing slightly larger error in position and velocity is due to the statistics of the fitting procedure and may be further improved by using a more robust parametrization of the dynamic target path to fit the data to arbitrary helical hypotrochoids and epitrochoids. In contrast, the error in the method of the prior art does not change much over that shown here.

For a tracker mounted on a bearing of OD 50 mm, subject to +−90 degrees oscillation, simulating noise with standard deviation of 2 micrometers for the tracker and 2 micrometers for the bearing, in each of the X-, Y- and Z-dimensions, based on 100 simulations of the error in angle due to the noise in the data, we obtain a maximum error of +−0.0026 degrees in the orientation angle and a maximum error of +−6 micrometers in the center of the circle. For +−60 degrees oscillation angle, we find a maximum error of +−0.005 degrees (2 sigma of 0.0042 degrees) in the orientation angle and maximum error in center of the circle of +−12 micrometers (2σ of 0.008 μm). For +−30 degrees, a maximum error of +−0.02 degrees and a maximum error in center of circle of +−39 micrometers are found. Note that the maximum expected deviation in each of the axis positions based on the tracker error is about 4 micrometers (2*sigma). This would be in addition to any error in centering of the cube-corner spherically mounted retroreflector (SMR) target with respect to the center of the sphere (commonly either +−12.5 micrometers or +−5 micrometers). So the overall error (2 sigma) in position due to conventional measurements is +−9 micrometers. The process of modulating the tracker position over an arc of +−9-degrees helps reduce this error to better than +−6 micrometers, the reduction mainly being due to the calibration process accounting for the centering error of the SMR. The process of fitting circles to data obtained over arcs of subtended angles smaller than +−90 degrees (i.e. a semicircle) increases the error in position determination. FIGS. 17 and 18 provide a summary of the statistical simulation results.

For arbitrary data, one could identify the plane of the data and transform the data into a new coordinate system (X'Y'Z') in which the plane of the data becomes the X'Y' plane and the X-axis bisects the data. One could fit three planes of the forms $Z=A_1x+B_1y+C_1$, $X=A_2y+B_2z+C_2$, $Y=A_3z+B_3x+C_3$ and choose the fit which gives the smallest coefficients for $A_i$ and $B_i$ as the best description of the plane of the data (this is to avoid poor curve fits, for instance when the data is along the X-Z plane). Then the extreme points of the section of the path can be identified (because the path data is actually position-vs. time) and the line between them can be taken to be parallel to the Y-axis. The origin can be approximately located by taking the average of a few data points in the middle of the path, seeing the distance (d$\hat{d}$) between this and the line joining the extreme points, and placing the center on the opposite side at (R−d)$\hat{d}$, where R is the instantaneous radius of the path at the last instant (or the approximate radius of the bearing). Once the data has been transformed into the new coordinate system, the circle fitting process would be the same. In all the curve fits that are carried out, the starting values can be those that were found in the prior time step, to decrease the time required for the optimization process.

While the above calculations are for the error in the position and orientation of the bearing, when the offset distance between the feature of interest (for instance a probe tip or another locating point on part) and the bearing increases, the uncertainty in feature position will be higher due to the additional contribution by orientation error to the position error. A four inch (100 mm) distance between the bearing and the feature will induce an additional position error of 4.54 micrometers due to an orientation error of 0.0026 degrees, still quite tolerable. For larger offset distances, the angle measurement can be made more precise by using a larger diameter bearing and fitting over larger amounts of data. For instance, just by increasing the number of data points to 3000 (typical # of data points per second for trackers) and the fitting angle to a full circle (1 rps=60 rpm), the maximum angular error reduces to 0.00018 degrees, which implies a 2σ error of about 21 micrometers (<0.001 inch) for an offset of 10 meters (400 inches).

Figure 14:
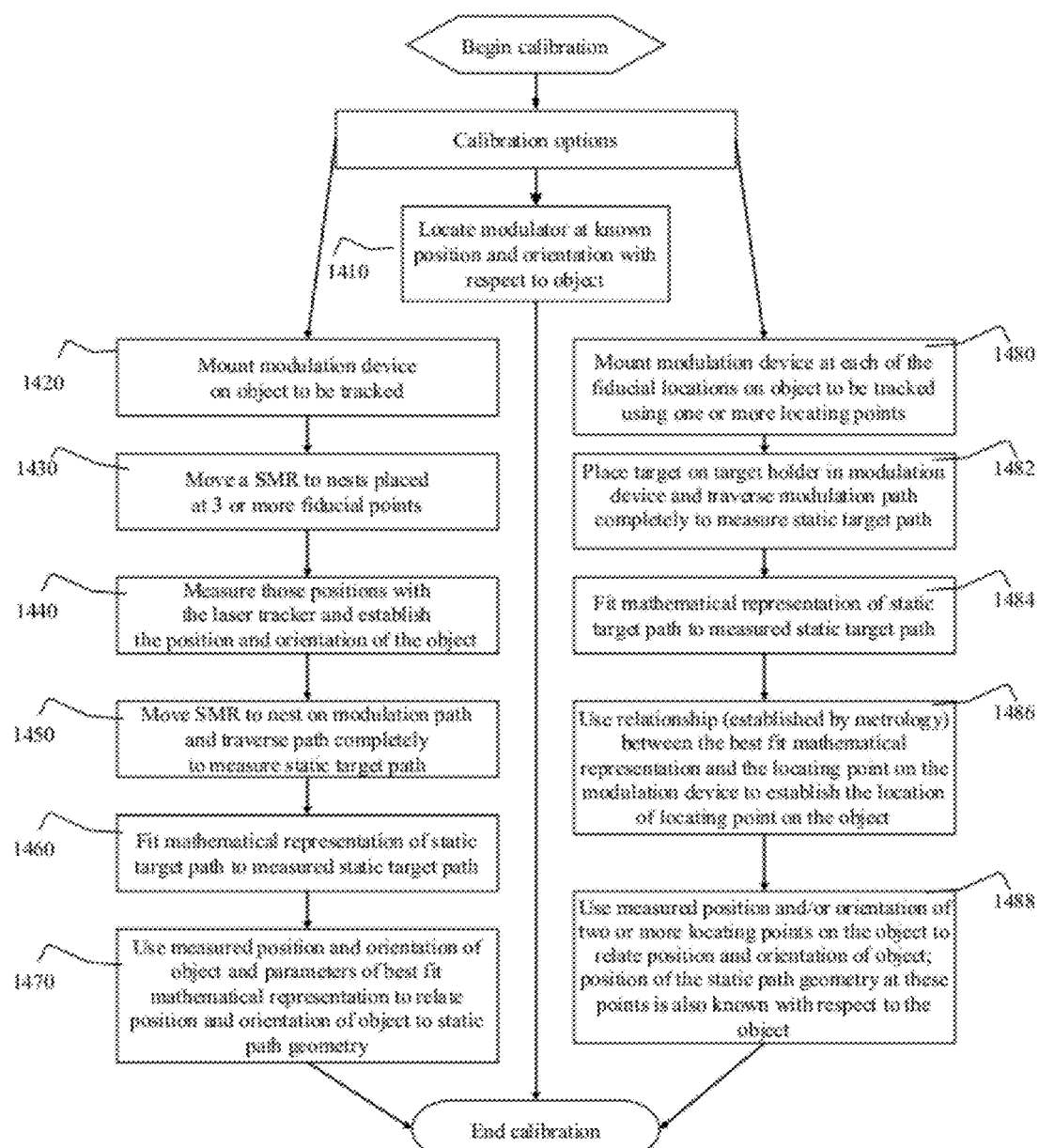
FIG. 14 shows a flowchart describing the key steps in three different methods of calibration

FIG. 14 shows a flowchart describing the key steps in three different methods of calibration. In one method, the modulating nest is located at a known position and orientation of the object and, along with the known interrelationships between the locating features on the modulating nest and the static target path, the relationship between the position and orientation of the static target path and the object is directly established.

In the second procedure, a target such as a SMR is moved sequentially between at least three locating points 295 on object 200 in order to measure the position and orientation of the object. Then it is moved to the modulating nest and is caused to traverse the modulation path. The measured position and orientation of the stationary target path is then spatially related to the position and orientation of the object.

In the third procedure, the modulating nest is located at least two locating points on the object, such as tooling ball locators. The stationary target path is measured at each and the For the third calibration procedure, where the modulated target is used to measure the position of each of multiple locating points, the modulated target may have to be mounted in a secure and deterministic manner with respect to the rigid body, so that there is no relative rotation with respect to the object.

All errors in the geometry of the track, for instance those caused by temperature changes, can be calibrated/determined periodically by keeping the body to be tracked fixed, moving the target along the track and then determining the position and orientation of the track with respect to the feature of the rigid body that is being tracked, (for instance, by manually removing the target from the track and moving it over the feature whose orientation with respect to the track needs to be measured, and then moving the target back to its nest on the track).

Large flexible structures can be tracked by using multiple modulated targets, each tracked by one position measuring device.

It is conceivable that the fitting can be so fast that for each new point measured and added to the path, the earliest point included in the path can be discarded and a new set of parameters describing the position, orientation, velocity and acceleration of the rigid body can be computed.

All sorts of filtering algorithms can be used to smooth the inferred position, orientation, velocity and acceleration of the rigid body.

System Level Overview

Figure 15:
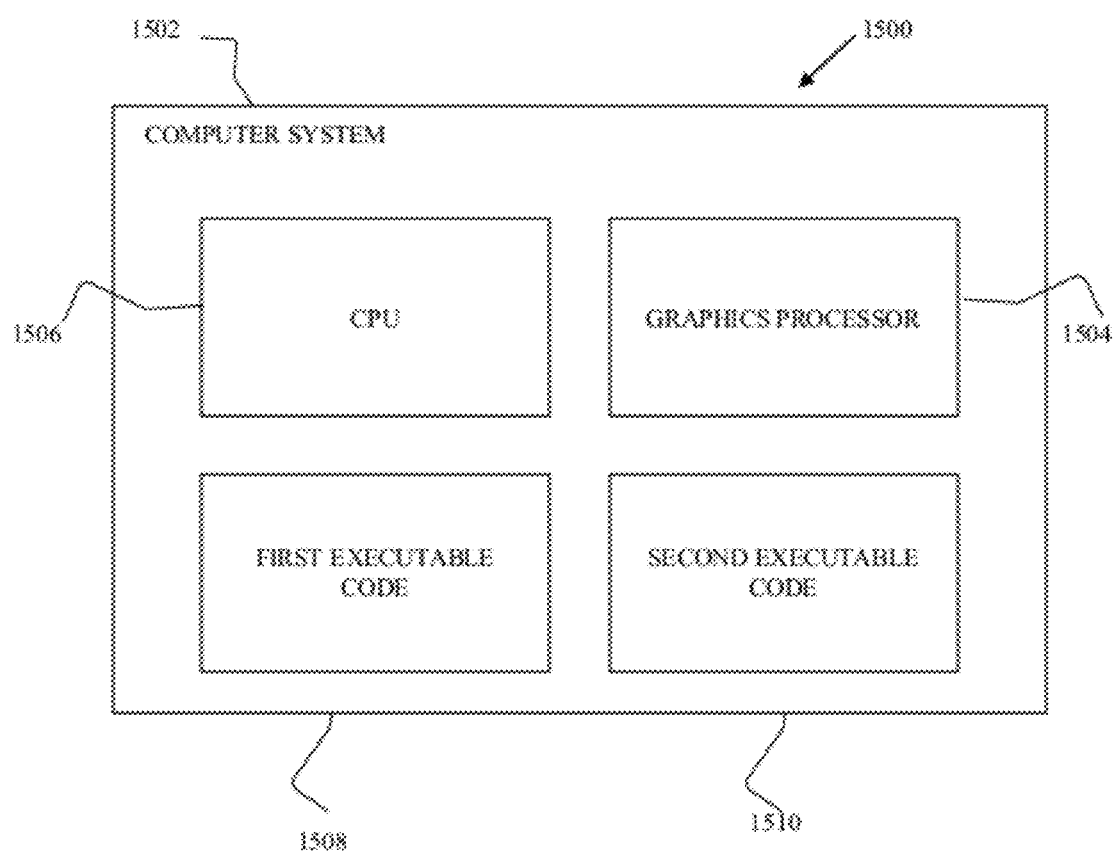
FIG. 15 shows a block diagram of a computer system and associated hardware and software components

FIG. 15 comprises a block diagram 1500 of computer system 1502. In various embodiments, the computer system 1502 includes a CPU 1504, graphics processor 1506 to store and display geometry and values associated with a spatial calculation. The computer system 1502 includes a first, 1508, second, 1510, and other executable codes to communicate with a position measurement system controller, use the obtained position data along a measured path segment to evaluate a velocity, position and orientation of an object. The evaluation is based on one or more algorithms to fit a mathematical description of the expected path of the target to the actual measured points along the path, as disclosed above. Some examples include a second executable code 1510 to perform other tasks such as calibrate the position and orientation of the static target path with respect to the object to be tracked, include the acceleration of the object in fitting a mathematical representation of the dynamic target path to the measured path segment, displaying the results to the user, alerting the user to user defined fault conditions, communicating results with other applications, etc. The first executable code can be a plug-in configured to work with the second executable code.

Hardware and Operating Environment

This section provides an overview of example hardware and the operating environments in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C.

The software components may communicate using a number of mechanisms well known to those skilled in the art, such as application program interfaces or inter-process communication techniques, including remote procedure calls. Computer storage includes random access memory (RAM), read only memory (ROM), erasable programmable readonly memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. The teachings of various embodiments are not limited to any particular programming language or environment. Thus, other embodiments may be realized, as discussed regarding FIG. 16.

The present subject matter includes an embodiment in the form of a computing device that includes a bus with a processor and memory coupled thereto. This embodiment further includes one or more instruction sets stored in the memory and executable by the processor to communicate with the controller of the position measuring system to obtain the measured positions and their times of measurement, calibrate the position and orientation of the static target path with respect to the object to be tracked, evaluate a position, orientation and velocity and possibly even the acceleration of the object by fitting a mathematical representation of the dynamic target path to the measured path segment, displaying the results to the user, alerting the user to user defined fault conditions, communicating results with other applications, etc.

Figure 16:
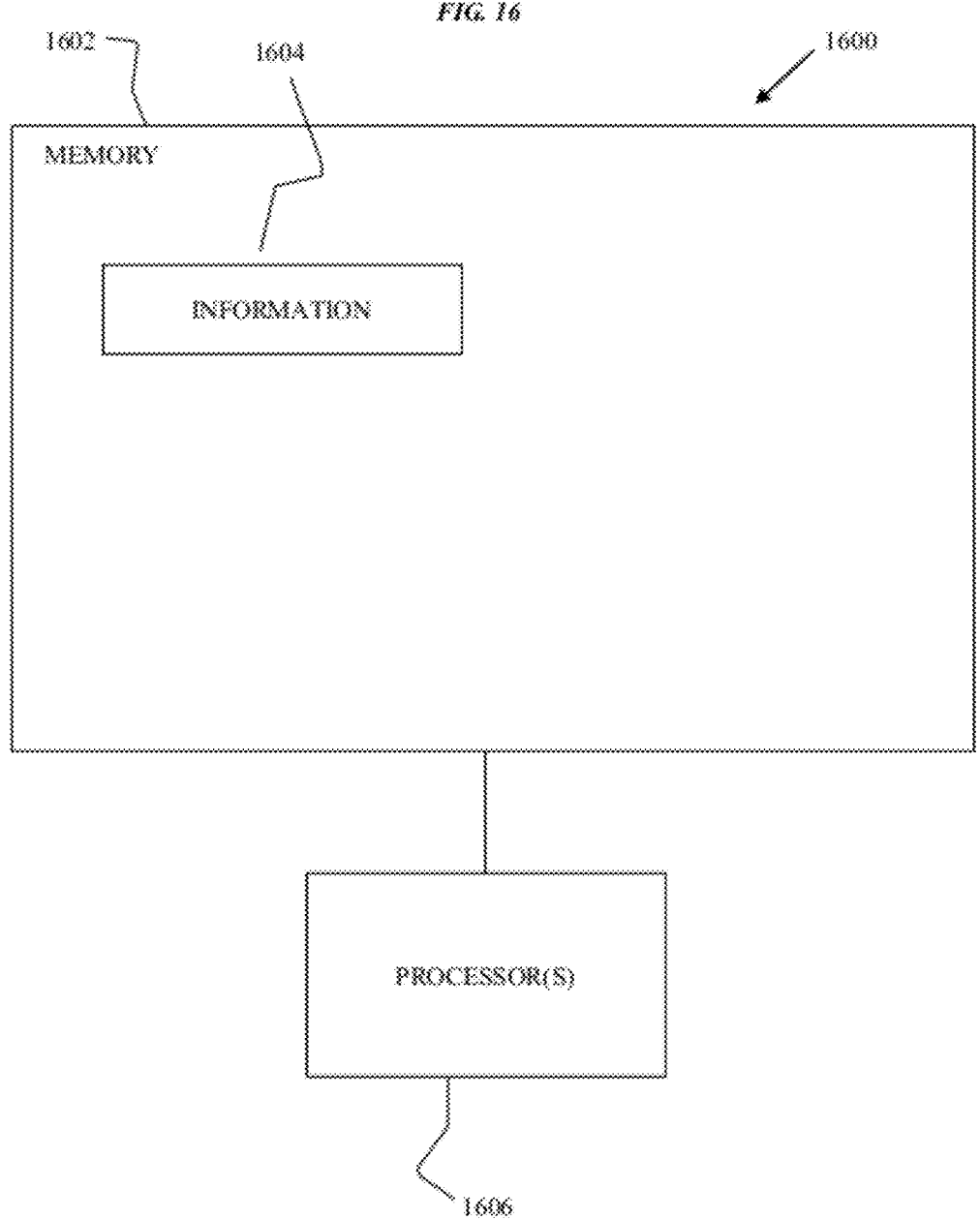
FIG. 16 shows a schematic diagram of a system that embodies the new method disclosed here FIG. 17 tabulates values noted over 100 simulations of 100 points each, with one sigma error of 2 micrometers in each of X, Y, and Z positions measured by the tracker and one sigma position error of 2 micrometers in each of X, Y, and Z positions due to bearing runout FIG. 18 tabulates values noted over 100 simulations of 3000 points each

FIG. 16 is a block diagram of an article 1600 according to various embodiments of the invention. Such embodiments may comprise a computer, a memory system, a magnetic or optical disk, some other storage device, or any type of electronic device or system. The article 1600 may include one or more processor(s) 1606 coupled to a machine-accessible medium such as a memory 1602 (e.g., a memory including electrical, optical, or electromagnetic elements). The medium may contain associated information 1604 (e.g., computer program instructions, data, or both) which, when accessed, results in a machine (e.g., the processor(s) 1606) performing the activities previously described herein.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventor also contemplates examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method for measuring six degrees of freedom of an object (all three positions and all three orientations), and for directly estimating its velocity, over a time interval, by
   using one position measuring device to measure a time sequence of positions of one target over the time interval,
   using a modulating nest affixed to the object to vary the position and/or orientation of the target with respect to the object over the time interval, along a modulation path,
   causing the sequence of points measured by the position measuring device to lie on a static target path when the object is stationary, said static target path being modified into a dynamic target path by the movement of the object, said dynamic target path being mathematically represented as a function of spatial variables and of time, said mathematical representation containing parameters that are related to the position and orientation of the static target path and the velocity of the object,
   identifying the values of the parameters of the mathematical representation of the dynamic target path that best fit the measured path segment,
   inferring the position and orientation of the static target path as well as the average velocity of the object over the time interval, from the parameters of the best fit mathematical representation of the dynamic target path, and
   obtaining the average position and orientation of the object, from those of the static target path.

2. The method of claim 1 wherein the acceleration of the object is also considered in the mathematical representation of the dynamic target path that is best fit to the measured path segment.

3. The method of claim 1 wherein the position and orientation of the static target path and the average velocity of the object are directly included among the independent parameters of the mathematical representation of the dynamic target path.

4. The method of claim 1 wherein the measured path segment covers at least a sufficient fraction of the dynamic target path so that it can be used to accurately determine the parameters of the dynamic target path that best fit the measured path segment.

5. The method of claim 1 wherein an initial fitting step is used to estimate the region of the static target path corresponding to the measured path segment,
   identifying the parameters of the mathematical representation of the region of the dynamic target path corresponding to the estimated portion of the static target path, and
   using this to find the mathematical representation of the dynamic target path that best fits the measured path segment.

6. The method of claim 1 wherein the steps are iterated over time to obtain continual measurements of the position, orientation and velocity of the object.

7. The method of claim 6 wherein measured path segments consist of more than two, but a relatively small number of points, to permit rapid tracking of the motion of the object.

8. The method of claim 6 wherein small measured path segments are used for fast updates of the velocity, and data from the current and one or more previous path segments, including raw data as well as results of fitting, are combined together in the fitting process to arrive at improved estimates of the position and orientation of the static target path.

9. The method of claim 6 extended to use more than one position measuring devices to each track and measure one target, for instance to track the relative deflections of a large structure.

10. The method of claim 1 wherein the portion of the static target path corresponding to the measured path segment is estimated by,
the static target path having geometric features that can be identified by curve fitting, and
having the dynamic target path correspond to at least a sufficient fraction of the static target path from which features can be identified uniquely.

11. The method of claim 1 wherein the portion of the static target path corresponding to the measured path segment is estimated, by
extracting the points from a continuous time sequence, maintaining a well controlled, known, speed of the target along the modulation path to permit using the times of the measured points to identify the portion of the static target path corresponding to the measured path segment, and
periodically identifying at least one fiducial feature to recalibrate the time reference to a positional reference along the static target path.

12. The method of claim 1 wherein the portion of the static target path corresponding to the measured path segment is estimated, by
using an encoder to track the position on the modulation path from which the corresponding portion of the static target path can be identified.

13. The method of claim 1, wherein any of the parameters of the mathematical representation of the dynamic target path that are unimportant are identified using the small gradients of the sum square error with respect to these variables at the best fit parameter values,
such parameters being neglected in one or more subsequent fits.

14. The method of claim 1, wherein the speed of movement of the target caused by the modulating nest is much faster than that caused by overall movement of the object on which the modulating nest is mounted, the relative speeds being such as to enable
mapping the measured path segment onto the identified portion of the static target path, assuming that the velocity of the object is zero, without significant error in the measured position and orientation of the object.

15. The method of claim 6 wherein the time interval corresponding to each measured path segment is set to match the desired time interval between updates of the position and orientation of the object being measured, which is chosen such that the velocity of the object over that time interval can be well approximated by a constant value.

16. The method of claim 6 wherein variations in measured velocities corresponding to neighboring time intervals is used to arrive at an interpolation of the position and orientation of the object versus time within each interval.

17. The method of claim 1 wherein the speed of movement along the modulation path induced by the modulating nest is set so that the target will traverse at least said sufficient fraction of the static target path in the time interval.

18. The method of claim 1 wherein the number of points measured during each time interval is set depending on the desired precision of determination of the position and orientation, by suitably adjusting the rate at which the points are measured by the position measuring device.

19. The method of claim 1 wherein the movement of the object detected during the fitting process, as well as the SSE (sum squared error) of the fit is used to infer the MPE (maximum possible error) in the measured position and orientation of the object, display this to the user and flag the measured position and orientation values using a different color for the display as a visual cue for when the MPE is higher than user defined values.

20. The method of claim 6 wherein one or more of the speed of the movement of the target caused by the modulating nest, the time interval of the measured path segment, the number of points in each measured path segment and the region of the modulation path used for modulation are modified depending on one or more of the measured velocity, position or orientation of the object.

21. The method of claim 1 wherein an initial calibration process is used to accurately relate the position and orientation of the static target path with respect to the position and orientation of the object.

22. The method of claim 1 wherein said calibration process includes measuring the position of the target at certain fiducial positions on the object and then moving the target to its holder (nest) on the modulation path, traversing the target along the modulation path and recording the static target path corresponding to the modulation path, all carried out with the object stationary.

23. The method of claim 1 wherein said calibration process consists of
moving the modulating nest to at least three fiducial positions, with the target in its holder, such that one or more locating devices on the modulating nest register with corresponding mating locating devices on the object at each fiducial location, said locating devices causing the modulating nest to be placed in a well defined position, but not orientation, with respect to the object,
traversing the target along the modulation path at each of these fiducial positions to measure the corresponding static target paths,
inferring the position of each of the fiducial points on the object at which the modulating nest has been located, using the known relationship of the static target path to the location of the one or more locating devices on the modulating nest, and
using the position of the fiducial points to calculate the position and orientation of the object and the position and orientation of at least one of the static target paths with respect to the object.

24. The method of claim 1 wherein said calibration process consists of
locating the modulating nest with the target in its holder, at one fiducial position on the object at which one or more locating devices on the modulating nest register with corresponding mating locating devices on the object, said locating devices causing the modulating nest to be placed in a well defined position and orientation with respect to the object,
traversing the target along the modulation path to measure the static target path,
inferring the position of the fiducial point and the orientation of the object, using the known relationship of the static target path to the location of the one or more locating devices on the modulating nest, thereby establishing the relationship between the static target path and the position and orientation of the object.

25. The method of claim 1 wherein the number of sequential positions along each measured path segment is large enough (thousands of points) to permit highly accurate determination of the position (to better than 3 μm/m) and orientation of the path (to better than 0.003°) by fitting the measured path segment to the dynamic target path measured by a position measuring instrument with an rms noise level of 20 μm.

26. The method of claim 1 wherein a measured path segment consists of at least one complete traverse of the target over the modulation path.

27. Method of claim 26 wherein the target rotates an integer number of times about its center for every complete traverse of the path 28. Method of claim 27 wherein the integer is zero, i.e., the target does not rotate about itself while traversing the path.

28. Method of claim 27 wherein the integer is zero, i.e., the target does not rotate about itself while traversing the path.

29. The method of claim 1 wherein the target is moved along one or more sections of the modulation path by mechanisms that include elastic deflection as a source of highly repeatable deflection.

30. The method of claim 1 wherein the modulation path is substantially a circle with deviations in the plane or out of it, possibly achieved using elastic deflections, serving as fiducial marks to determine the orientation about the axis of the circle.

31. The method of claim 1 wherein the speed of modulation of the position of the target along the path is precisely controlled so that the fitting process may be much simplified, to search for just the incremental position and rotation of the object that would give rise to target positions with minimum deviation from the measured positions.

32. The method of claim 1 wherein the object is a hand-held probe such as a touch trigger probe, laser scanner, or the like.

33. The method of claim 32 wherein the hand-held probe is stabilized by a gyroscope.

34. An apparatus comprised of a device containing a fixed path and a means for holding and moving a target in a highly repeatable manner along this path, which is used to modulate the position of the target, which is recorded by a position measuring device, and a processing means for analyzing the measured path using software that takes as input a mathematical representation of the geometry of the path and identifies parameters of the best fit representation of the path, for the purpose of determining the position, orientation and velocity of any object to which the apparatus is affixed.

35. An apparatus of claim 34, comprising a precision rotary bearing on which a target that is tracked is mounted, wherein the bearing is rotated to displace the target along a circular path, so that the position measurement device records the path (measures the position as a function of time), which is then used to determine the position, orientation and velocity of the rigid body on which the rotary bearing is mounted, wherein the measured orientation of the path is used to compensate for the depth and lateral errors caused by the target being a solid glass trihedral prism targets.

36. A system, comprising at least one modulating nest with at least one rigid path and means to move at least one target along the one or more paths and at least one processor that is either the same as that of the at least one position measurement system, or communicatively linked to it a memory communicatively coupled to the processor and holding an instruction set executable on the processor to cause the system to maintain, in the memory device, mathematical information about the geometry of the at least one paths maintain, in the memory device, one or more sets of instructions for determining the rigid body transformation of the path that best fits the points measured by the position measuring system, evaluate the position and orientation of the path by fitting the path to the measured positions of the target, and evaluates, records and displays the position and orientation of one or more other points on the object based on their known spatial relationships to the modulating nest.

* * * * *